April 18, 1967   F. A. KOCIAN   3,314,735
LUBRICATED BEARING AND HOUSING MOUNTED FITTING THEREFOR
Original Filed Aug. 21, 1964

INVENTOR
FRANK A. KOCIAN
John W. Haines
ATT'Y

United States Patent Office 3,314,735
Patented Apr. 18, 1967

3,314,735
LUBRICATED BEARING AND HOUSING MOUNTED FITTING THEREFOR
Frank A. Kocian, Evergreen Park, Ill., assignor to International Harvester Company, a corporation of Delaware
Continuation of application Ser. No. 391,097, Aug. 21, 1964. This application Jan. 6, 1966, Ser. No. 519,050
10 Claims. (Cl. 308—187)

The present case is a continuing application of my U.S. patent application Ser. No. 391,097, filed Aug. 21, 1964, and the disclosure of the latter is incorporated in entirety herein by reference.

This invention relates to a sealed and lubricated bearing assembly comprising an anti-friction bearing, the bearing being provided with an outer race, and received in a sheet metal mounting or cartridge housing which supports such race. The outer race is relatively movable due to a lubricated, frusto-spherical interface of sliding contact formed between it and the sheet metal mounting, and thus the bearing assembly in respect of the bearing axis is self aligning.

In devices of this character, a grease fitting is usually provided which registers with, or is received in, a port in the outer bearing race and which delivers lubricant internally of the outer race along and over the anti-friction balls therein.

In contrast to the device which is disclosed in my aforesaid application Ser. No. 391,097, and in whch the lubricant fitting is mounted on the outer race, the present fitting through which lubricant is to be ported into the outer race is mounted to a part separate from the latter, specifically, to the sheet metal housing.

A sealing problem and, moreover, a registration problem are thereby introduced. Sealing is a problem because the outer race and the housing necessarily work with respect to one another in order that the bearing axis can adjust in self alignment. Also, the race has some circumferential adjustment on the axis of the bearing, but nothing in the sense of appreciable rotation for the reason that the lubrication port in the outer race and the fitting in the sheet metal housing would then fail to register. Even more importantly, it is undesirable that the outer race accommodate circumferential rotation on its spherical interface of contact, because the anti-friction balls are designed and provided for that express purpose.

In the bearing device as herein illustrated, the body portion of the housing or mounting extends circumferentially, and in a generally axial direction from opposite sides of an outturned pair of central mounting flanges which are face to face. The lubricant fitting is press fitted in an opening in the body of the sheet metal mounting, which opening is offset from the plane of the central mounting flanges.

According to my invention, I provide an enlarged inner end or base portion on the lubricant fitting which is trapped between the housing or mounting and the outer race. The enlarged trapped portion in the present illustrative example is a circular flange or disk, and serves three functions, first, it prevents outward loss of the fitting from the bearing cartridge, second, it inter-penetrates into a flat on the confronting outer race to lock the race against rotation on the bearing axis and, third, it functions as a spacer to prevent the flat and the confronting portion of the housing body from over-stressing or smashing a ring seal herein provided and forming between the outer race and body a ring of pressure sealing contact about the internal end of the fitting.

By way of a further sealing feature in accordance with my invention, a large annular seal is provided about the outer race, which seal is in the plane of the mounting flanges and occupies an included space between the outer bearing race and confronting portions of the body and mounting flanges. Generally, but not in all cases, the outer ring has a loose fit against the complemental frusto-spherical surfaces of the housing body, and the interposed annular seal functions as a shock absorber therebetween and to stabilize the physical position of the outer ring. The more important functions, however, are sealing one side of the bearing from the other along the plane of the mounting flanges so as to protect the comparatively smaller ring seal about the fitting, and also sealing the frusto-spherical surfaces from contamination which could enter between the stamped, face-to-face mounting flanges.

Various features, objects, and advantages will be either specifically pointed out or become apparent when, for a better understanding of the invention, reference is made to the following description, taken in conjunction with the accompaying drawing which shows a preferred embodiment thereof and in which.

Figure 1:
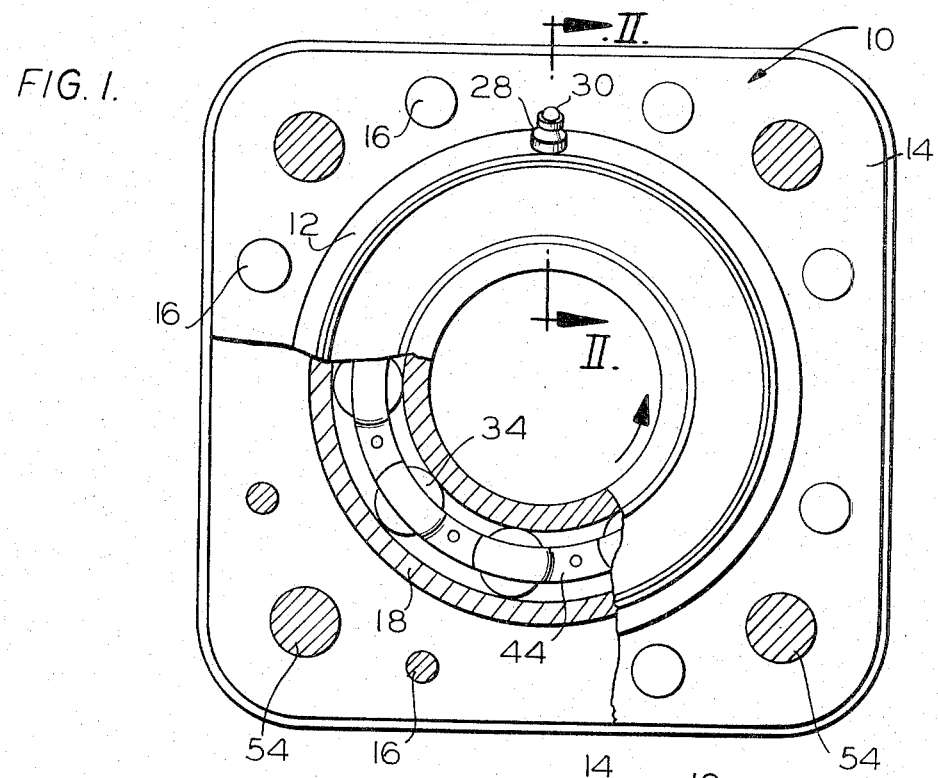
FIGURE 1 is a front elevational view of the face of a unitized cartridge bearing embodying the present invention.
Figure 2:
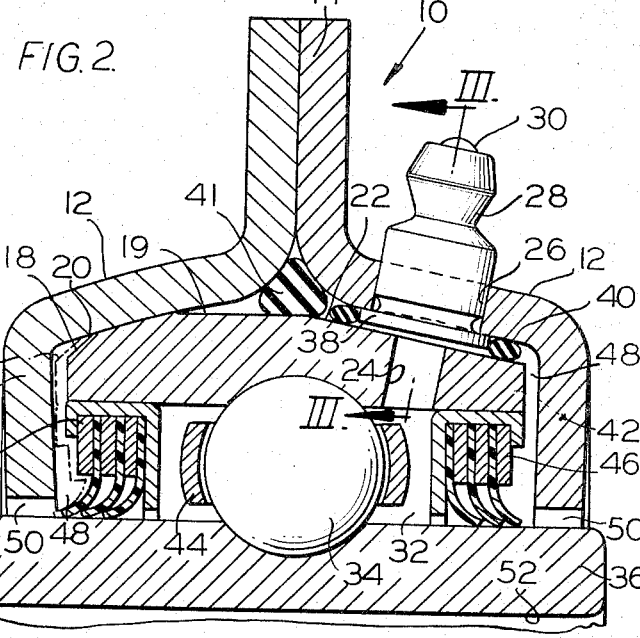
FIGURE 2 is an enlarged side elevational view taken in fragmentary longitudinal section along the lines II—II in FIGURE 1.

More particularly in the drawing, a bearing 10 has a housing arranged with a circumferentially extending, generally axial body 12 and carried by an outturned pair of face-to-face, radially extending central plates 14 forming mounting flanges for the bearing 10. Preferably, the housing is formed of generally symmetrical halves, which are sheet metal stampings secured permanently together by welding or, as illustrated, by a series of rivets 16 lodged in rivet holes in the mounting flanges 14.

An anti-friction bearing has an outer race 18. On its outer periphery, the race 18 presents a cylindrical center portion 19 and oppositely sloping, frusto-spherical surfaces 20 which are complementary to the housing body 12 to form a spherical interface of contact. A so-called spot-faced flat surface 22 in an area on one of the spherical surfaces 20 surrounds a generally radial lubricant port 24 formed adjacent one end of the outer race 18.

A radial aperture or opening 26 formed in the housing body 12 is offset from the plane of the mounting flanges 14 so as generally to register with the port 24, and the opening accepts therein a press fitted lubricant fitting 28. The fitting 28 is hollow and carries in the external end thereof a one-way ball valve 30. When the fitting receives a grease gun, not shown, the valve 30 opens to allow flow of lubricant internally of the fitting 28, through the wall opening 26 in the housing body 12, through the radial port or passage 24 in the race, and into a primary grease chamber 32 so as to pass along and over a series of anti-friction balls 34 riding between the outer race 18 and an inner race 36.

An internal circular flange or disk 38 integrally forms an enlarged portion of the fitting 28 at the base, and interengages with the wall of the body 12 to prevent outward loss of the fitting 28 through the opening 26.

A small O-ring seal 40 is carried in the area of relative relief afforded by the flat 22 and is arranged to form between the outer race 18 and the housing body 12 an inner and outer ring of pressure sealing contact about the base flange 38 of the fitting 28. The seal 40 is in tension about the flange 38 and acts as a tight conduit holding lubricant within the ring of pressure contact and at the same time blocking out contaminants on the outside of the seal ring.

A large O-ring seal 41 disposed in the plane of the mounting flanges 14 is stretched about the circumferential portion 19 of the outer race and occupies an included space or interstice between the outer bearing race 18 and confronting portions of the body 12 and the mounting flanges 14. The O-ring seal 41 seals one side of the bearing 10 from the other side and, inasmuch as the mounting flanges 14 are simply rough stampings, it also seals out contaminants which would otherwise sift into the bearing along the inside faces of the flanges 14.

The housing halves include radially inwardly extending flanges 42 carried one on each of the outer ends of the housing body 12. During adjustment of the bearing axis transversely for self alignment, one or the other of the inturned flanges 42 at the outer ends of the body, each being closely axially gapped apart from the adjacent end of the bearing race 18 at that end, is engaged when the bearing race takes the broken line position 18a so as to limit such transverse movement.

The balls 34 are retained in a retainer cage 44 which moves with the balls in the primary grease chamber 32. Triplet, one-way seals 46 disposed one at each side of the grease chamber 32, separate the chamber at each side from a secondary grease chamber 48 at that side. Each secondary chamber 48 communicates with the outside through a generally circumferential, lubricant escape gap 50 which is defined by the inner race 36 and the confronting edge of the flange 42, and which extends generally axially. The flange 42 blocks out heavy dirt contaminants, and grass and wire-like materials which tend to wrap around the arbor.

Although the interior 52 of the inner race 36 may be formed as a square opening to receive an arbor bolt having a square cross-section, the interior 52 as actually illustrated is circular for reception of either a round section arbor bolt, or a disk harrow spool or spacer. The present cartridge bearing 10 receives bolts 54 in openings at the four corners of the mounting flanges 14 and is primarily adapted in this manner for carrying an arbor bolt on which the plural disks of an agricultural harrow are operatively supported. The self aligning feature enables the arbor bolt to flex and recover more readily under bending forces and therefore not to take a set due to being permanently bent in a local area.

Figure 3:
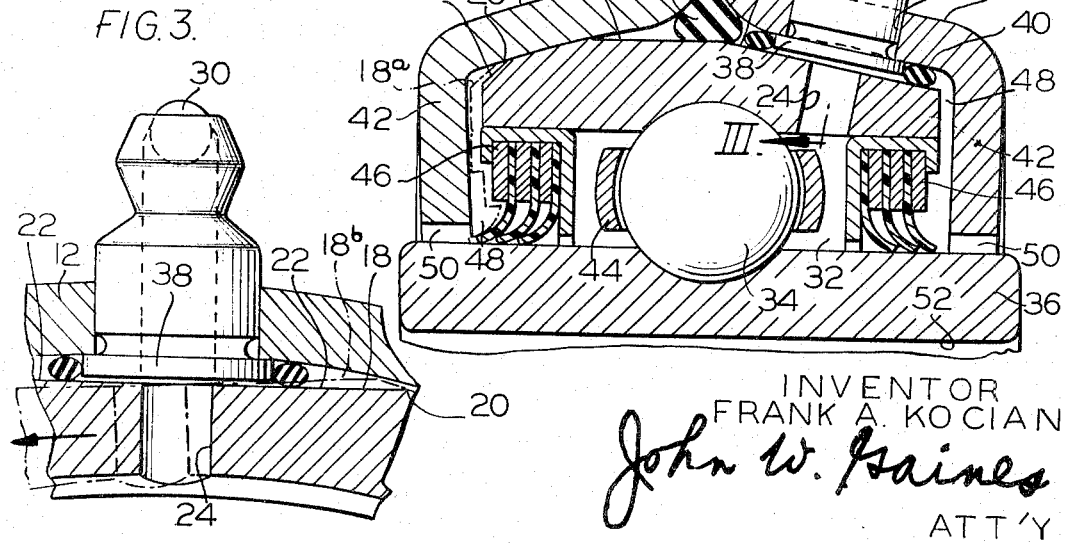
FIGURE 3 is a further enlarged sectional view of a detail taken along the lines III—III in FIGURE 2.

During rotation of the bearing in the direction indicated by the arrows in FIGURES 1 and 3, the outer race 18 moves into the broken line position 18b (FIGURE 3) in which the plane of the flat 22 and the plane of the flange 38 come into abutting relation, and in which the outer race is thereby locked against rotating on the bearing axis. Locking occurs in the opposite direction of rotation as well, but the locking in neither case interferes with the limited floating action of the outer race on its frusto-spherical surfaces 20.

The axis of the hollow fitting 28, when extended, intersects the plane of the central mounting flanges 14 at an acute angle which, in one physically constructed embodiment of the invention, was 13° so as to afford proper spacing for reception of the referred to grease gun on the fitting. Grease which is displaced from the primary grease chamber 32 forces past the lips of the one-way seals 46, fills the secondary chambers 48, and then escapes from the bearing through the restrictive escape gap 50 so as to carry out contaminant therewith. As the bearing axis adjusts, grease from the secondary chamber 48 is displaced and works into the interface of frusto-spherical contact between the outer race and the housing body 12.

As herein illustrated, the flange 38 serves as an interengagement between the sidewall of the fitting and the wall of the housing body 12. It is evident that in lieu thereof, other interengaging flange means can be formed on the body 12, for example, integral flangelike tangs or an actual thin flange, formed about the outside mouth of the opening 26 and thereafter spun into a circumferential groove which can be provided in the fitting 28 in a transversely registering position with the outside mouth of the opening 26. In either case, the flanges will be located internally of the structure so as to be protected, and they will lockingly prevent outward loss of the fitting.

What is claimed is:
1. In a self aligning, cartridge bearing having a cartridge housing presenting an apertured, circumferentially extending, generally axial body, a bearing in the housing arranged with the bearing outer race and the confronting housing body having a frusto-spherical interface of contact, and a hollow lubricant fitting in the aperture in said body, the improvement of:
said fitting being fixed in said body aperture, and having flange means carried by the fitting;
the interface of frusto-spherical contact being relatively relieved between the outer race and the confronting housing body in a coextensive portion with the flange means;
said flange means being trapped between the housing body and the outer race and interengaged with the walls of the body aperture to insure against removal of the fixed fitting in either direction axially.
2. The invention of claim 1,
said flange means being carried at the base of the fitting and being circumferentially wider than the aperture so as to over-lap with the housing wall.
3. The invention of claim 2,
including an annular seal carried in said relatively relieved portion and arranged to form between the outer race and housing body a ring of pressure sealing contact about the flange means.
4. The invention of claim 3,
further including lubricant receiving port means presented by the outer race and communicating with the relieved portion at a point within said ring of pressure contact.
5. The invention of claim 4,
said flange means being of a planar, disk shape and presenting a first flat,
said relative relief comprising a flat on the frusto-spherical periphery of the bearing outer race,
said first flat and the latter flat being in separate planes which, when the bearing race and housing relatively move in a transverse plane, accommodate to such movement by approaching but not contacting one another and which, when the bearing race and housing relatively move on the bearing axis, come into interfering engagement with one another locking the outer race against rotation on said axis.
6. The invention of claim 5,
said housing comprising radially inwardly extending first flanges on the outer ends of the housing body, the flange at each outer end of the housing body being closely spaced apart from, and engageable by, the end of the bearing race at that end so as to limit transverse movement of the race.
7. The invention of claim 6,
the body of said housing being in halves separately carrying the first flanges at said outer ends respectively;
said housing comprising radially outwardly extending plates carried to the adjacent ends of the body housing halves in face-to-face relation as to form central mounting, second flanges;
said fitting, aperture, and port being laterally offset from the plane of the central mounting flanges and substantially on a common axis which, when extended, intersects said plane at an acute angle.
8. The invention of claim 7,
further comprising a seal about the outer race, which is in the plane of the central mounting flanges and which occupies an included space between the outer bearing race and confronting portions of the body and mounting flanges.

9. A unitary self aligning bearing assembly of the type adapted to rotatably support a shaft, said assembly comprising:
- a lubricant containing bearing unit having outer and inner races and a plurality of included antifriction elements therebetween;
- a relatively fixed member adapted to support the outer race, and together therewith having coactive surfaces of spherical cross section;
- said support member comprising end flanges which are on the outer ends of the body thereof and which extend radially inwardly therefrom;
- the inner race extending externally beyond the end flanges and the end flanges extending externally beyond the outer race;
- the flange at each outer end of the support member forming, with the outer and inner races, respectively, axially gapped means with, and being engageable by the end of the outer race at that end so as to limit transverse movement of such race as the bearing axis adjusts, and radially gapped, restrictive escape means through which externally escaping lubricant is forced primarily axially;
- the interior of said bearing unit defining primary grease chamber means;
- said primary grease chamber means, axially gapped means, and radially gapped escape means adjoining one another;
- a grease fitting;
- a port formed in the outer bearing race and receiving the grease fitting and a registering opening formed in the support member and together arranged whereby lubricant from the fitting can be forced in a path of flow entering said port, filling said primary grease chamber means, and preferentially filling said axially gapped means prior at least to any substantial escape of lubricant externally through the radially gapped escape means; and
- a flange at the base of the fitting occupying an area of relative relief between the support member and the outer race, said flange, as viewed along the side of said fitting, being wider than the dimension of said opening and being trapped between the support member and the outer race to prevent removal of the fitting in either direction axially.

10. The invention of claim 9,
including an annular seal carried in said relatively relieved area and arranged to form between the outer race and the support member a ring of pressure sealing contact about the base flange on the fitting.

References Cited by the Examiner
UNITED STATES PATENTS

| | | | |
|---|---|---|---|
| 2,455,166 | 11/1948 | Firth | 308—187 |
| 2,613,117 | 10/1952 | Lee | 308—187 |
| 2,731,310 | 1/1956 | Potter | 308—194 |

MARTIN P. SCHWADRON, *Primary Examiner.*
FRANK SUSKO, *Examiner.*